US008917009B2

United States Patent
Woo et al.

(10) Patent No.: US 8,917,009 B2
(45) Date of Patent: Dec. 23, 2014

(54) VIBRATION GENERATOR AND ELECTRONIC DEVICE INCLUDING THE SAME

(75) Inventors: Ki Suk Woo, Seoul (KR); Yeon Ho Son, Gyunggi-do (KR); Jae Kyung Kim, Gyunggi-do (KR); Dong Sun Park, Seoul (KR); Ji Yeoun Jang, Gyunggi-do (KR); Kum Kyung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 677 days.

(21) Appl. No.: 12/929,172

(22) Filed: Jan. 5, 2011

(65) Prior Publication Data

US 2012/0026103 A1 Feb. 2, 2012

(30) Foreign Application Priority Data

Jul. 28, 2010 (KR) .................. 10-2010-0072735
Oct. 4, 2010 (KR) .................. 10-2010-0096466

(51) Int. Cl.
*H02N 2/00* (2006.01)
(52) U.S. Cl.
CPC ............. *H02N 2/005* (2013.01); *H02N 2/0055* (2013.01)
USPC ............................ 310/328; 310/329; 310/348
(58) Field of Classification Search
CPC ..................................................... H02N 2/005
USPC ........ 310/323.01–323.21, 328, 345, 348, 351
See application file for complete search history.

(56) References Cited

U.S. PATENT DOCUMENTS

| 7,692,363 | B2* | 4/2010 | Butler et al. | 310/329 |
|---|---|---|---|---|
| 7,839,058 | B1* | 11/2010 | Churchill et al. | 310/339 |
| 8,319,397 | B2* | 11/2012 | Ko et al. | 310/329 |
| 2005/0082950 | A1* | 4/2005 | Zakoji | 310/348 |
| 2006/0001331 | A1 | 1/2006 | Nagahama | |
| 2006/0159295 | A1 | 7/2006 | Onishi et al. | |
| 2006/0175937 | A1* | 8/2006 | Clingman et al. | 310/339 |
| 2007/0188050 | A1 | 8/2007 | Hashimoto | |
| 2008/0192584 | A1 | 8/2008 | Yamazaki | |
| 2008/0284285 | A1* | 11/2008 | Sato | 310/323.16 |

FOREIGN PATENT DOCUMENTS

| CN | 1722600 | 1/2006 |
|---|---|---|
| CN | 101247094 | 8/2006 |
| CN | 101022254 | 8/2007 |

(Continued)

OTHER PUBLICATIONS

Chinese Office Action issued on Sep. 4, 2013 in corresponding Chinese Application No. 201110083024.4.

(Continued)

*Primary Examiner* — Derek Rosenau (57) ABSTRACT

Disclosed are a vibration generator, which can increase the vibration force of a vibration plate by additionally applying the mass of a mass body to the vibration plate, and an electronic device including the same. The vibration generator includes at least one piezoelectric element mounted inside the case and subjected to compression and expansion in response to input power, a vibration plate including a body elongated in a preset lengthwise direction and having the at least one piezoelectric element mounted thereon, and generating vibrations by the compression and expansion of the at least one piezoelectric element, and at least one mass part adding a preset magnitude of mass to the vibration plate.

18 Claims, 8 Drawing Sheets

(56) References Cited

FOREIGN PATENT DOCUMENTS

| CN | 1813487 | 8/2008 |
| JP | 02-209339 | 8/1990 |
| JP | 08-086802 | 4/1996 |
| KR | 10-2007-0019332 | 2/2007 |

OTHER PUBLICATIONS

Chinese Office Action issued Jun. 4, 2014 in corresponding Chinese Patent Application No. 201110083024.4.

* cited by examiner

VIBRATION GENERATOR AND ELECTRONIC DEVICE INCLUDING THE SAME

CROSS-REFERENCE TO RELATED APPLICATIONS

This application claims the priority of Korean Patent Application No. 10-2010-0072735 filed on Jul. 28, 2010 and Korean Patent Application No. 10-2010-0096466 filed on Oct. 4, 2010 in the Korean Intellectual Property Office, the disclosures of which are incorporated herein by reference.

BACKGROUND OF THE INVENTION

1. Field of the Invention

The present invention relates to a vibration generator and an electronic device including the same, and more particularly, to a vibration generator, capable of enhancing the vibration force of a vibration plate by additionally applying (adding) the mass of amass body to a vibration plate, and an electronic device including the same.

2. Description of the Related Art

Recently, the use of touch-type devices allowing for an inputting operation in electronic devices through a user's touch (e.g. finger contact) is generalized according to the demands of users who desire to use electronic appliances in a simpler manner.

Currently, a haptic feedback device follows the concept of providing an intuitional user inference experience and diversifying types of contact feedback, in addition to facilitating the concept of performing an inputting operation through a touch.

The haptic feedback device has many advantages: It can save space, accomplish an improvement in manipulation and simplicity, allow for a simple change in specification, have a high level of user recognition, and have good interworkability with IT devices.

With such advantages, the haptic feedback device is commonly employed in electronic devices used in home computers, traffic note issuing devices, public information services, medical equipment, for mobile communications purposes and the like.

In general, the related art electronic device uses a vibration motor to implement a haptic function. The vibration motor was devised to vibrate the entire electronic device body, so, in order to increase vibration force, the size of a mass body needs to be increased.

For this reason, the haptic feedback device and the electronic device having the same have an undesirably large volume.

SUMMARY OF THE INVENTION

An aspect of the present invention provides a vibration generator enhancing the vibration force of a vibration plate by additionally applying the mass of a mass body to the vibration plate, and an electronic device including the same.

According to an aspect of the present invention, there is provided a vibration generator including: at least one piezoelectric element subjected to compression and expansion in response to input power; a vibration plate including a body elongated in a preset lengthwise direction and having the at least one piezoelectric element mounted thereon, and generating vibrations by the compression and expansion of the at least one piezoelectric element; and at least one mass part adding a preset magnitude of mass to the vibration plate.

The vibration generator may further include a mounting part extending from the vibration plate and having the at least one mass part mounted thereon to apply the mass of the at least one mass part to the vibration plate.

The mounting part may apply the mass of the at least one mass part to a central portion of the vibration plate in the lengthwise direction thereof.

The mass part may include a first mass body and a second mass body disposed to have the vibration plate placed therebetween, and adding mass thereof to the vibration plate.

The mounting part may include: a first mounting region on which the first mass body is mounted; a second mounting region on which the second mass body is mounted; a first connection portion connected between the central portion of the vibration plate and the first mounting region, and applying the mass of the first mass body to the vibration plate; and a second connection portion connected between the central portion of the vibration plate and the second mounting region, and applying the mass of the second mass body to the vibration plate.

The vibration generator may further include a receiving part receiving the vibration plate and the mounting part.

The vibration generator may further include a support part placed at each end of the body in the lengthwise direction, and supporting the body from the receiving part.

The mass body may be formed of a metallic material having a preset density.

The mass body may be formed of at least one metallic material of stainless steel (SUS) and tungsten.

The vibration plate may be formed of a metallic material.

The vibration plate may be formed of Invar.

The at least one piezoelectric element may be a monolayer piezoelectric element or a multilayer piezoelectric element.

The vibration generator may further include a connection part extending from the vibration plate and connected to the at least one mass body to apply the mass of the at least one mass body to the vibration plate.

The connection part may connect the at least one mass body to a central portion of the vibration plate in the lengthwise direction thereof to apply the mass of the at least one mass body to the central portion.

The mass part may include a first mass body and a second mass body having the vibration plate placed therebetween and adding mass thereof to the vibration plate.

The connection part may include: a first connection unit connected between the central portion of the vibration plate and the first mass body and applying the mass of the first mass body to the vibration plate; and a second connection unit connected between the central portion of the vibration plate and the second mass body and applying the mass of the second mass body to the vibration plate.

The vibration generator may further include a receiving part receiving the vibration plate, the connection part and the mass part.

According to another aspect of the present invention, there is provided an electronic device including: a display module displaying an image upon a user's selection; a case having an internal space receiving the display module; and a vibration generator including: at least one piezoelectric element mounted inside the case and subjected to compression and expansion in response to input power; a vibration plate including a body elongated in a preset lengthwise direction and having the at least one piezoelectric element mounted thereon, and generating vibrations by the compression and expansion of the at least one piezoelectric element; and at least one mass part adding a preset magnitude of mass to the vibration plate.

The vibration generator may be mounted on an inner surface of the case.

The vibration generator may be mounted on a bottom surface of the display module.

The display module may include: a touch panel receiving a user's contact as input; and a display panel contacting a bottom surface of the touch panel and providing an image corresponding to the contact on the touch panel.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
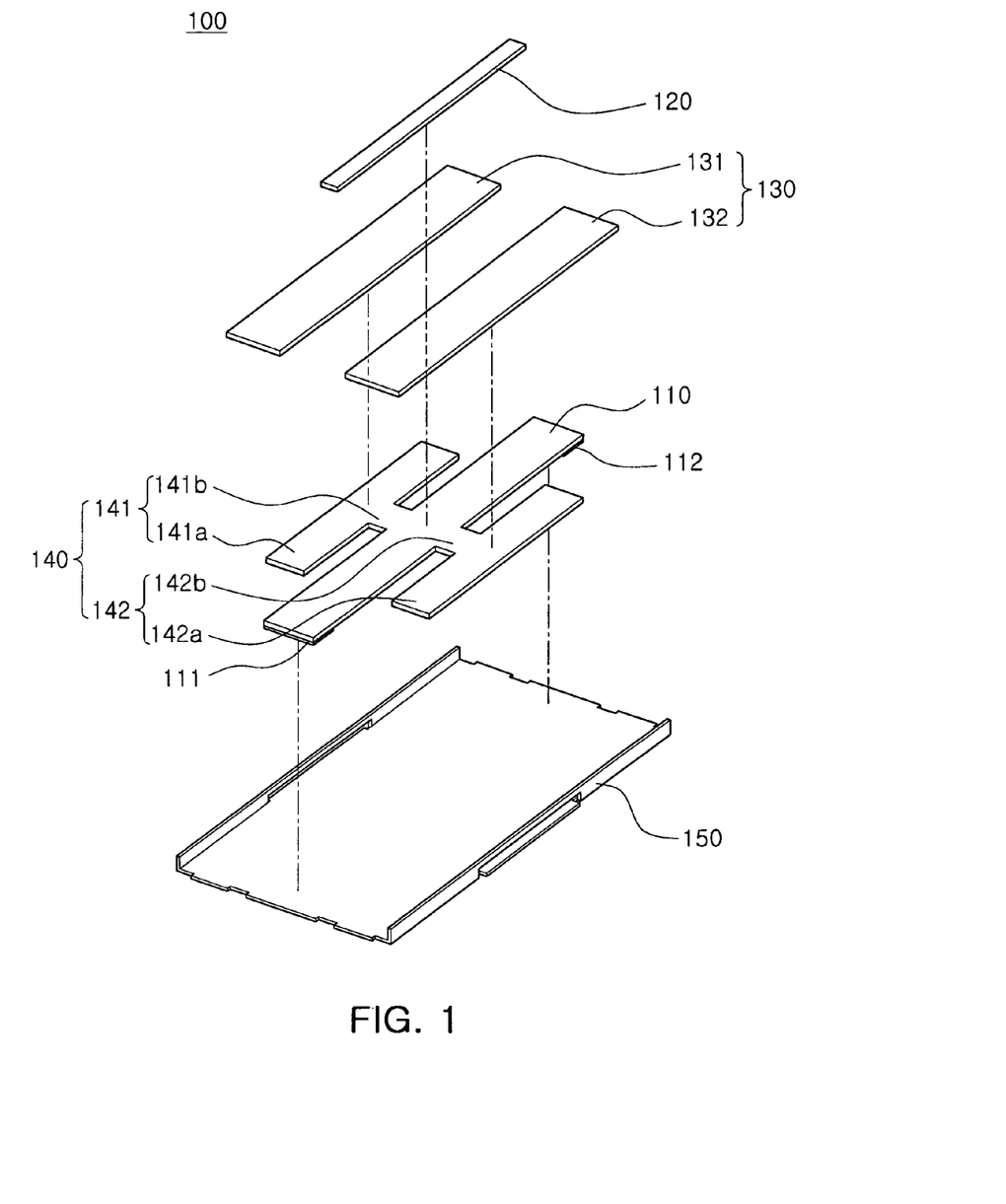
FIG. 1 is a schematic exploded perspective view illustrating a vibration generator according to an exemplary embodiment of the present invention.
Figure 2A:
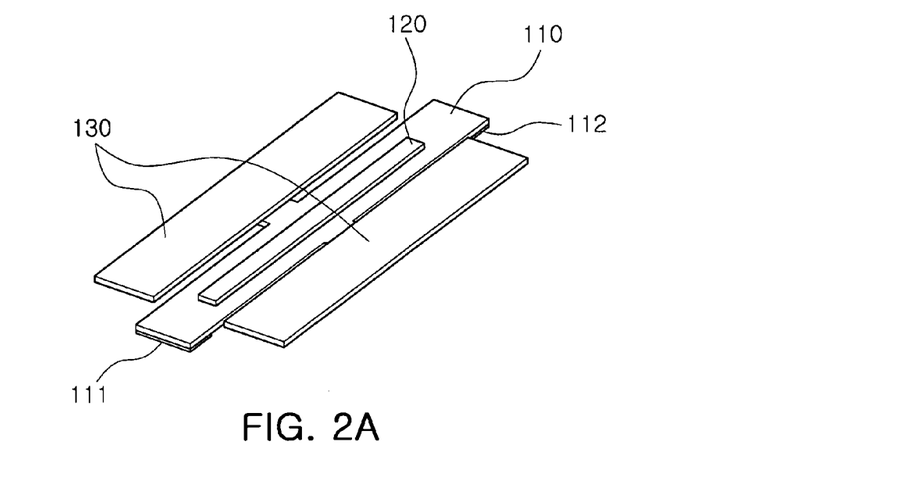
FIG. 2A is a partial perspective view illustrating the vibration generator of FIG. 1.

FIG. 1 is a schematic exploded perspective view illustrating a vibration generator according to an exemplary embodiment of the present invention. FIG. 2A is a partial perspective view illustrating the vibration generator according to this exemplary embodiment of the present invention, and FIG. 2B is a front view illustrating the vibration generator according to this exemplary embodiment of the present invention.

Figure 2B:
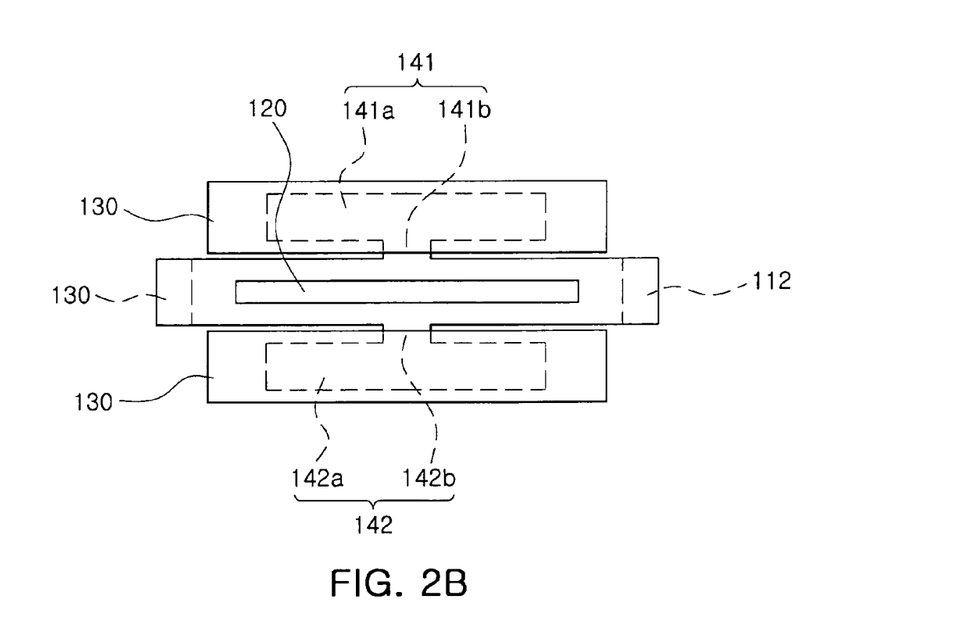
FIG. 2B is a front view illustrating the vibration generator of FIG. 1.

Referring to FIGS. 1, 2A and 2B, a vibration generator 100, according to an exemplary embodiment of the present invention, may include a vibration plate 110, at least one piezoelectric element 120, a mass part 130, a mounting part 140 and a receiving part 150.

The vibration plate 110 includes a body having a preset length, and may vibrate due to its body being bent when vibrations are applied thereto. The mounting part 140 may be formed at a central portion of the body in the lengthwise direction of the body. Here, term 'central portion' may refer to a portion covering the center and the vicinity of the center of the body in the lengthwise direction.

Furthermore, respective support parts 111 and 112 may be placed at both ends of the body in the lengthwise direction thereof. The support parts 111 and 112 contact the receiving part 150 to thereby support the body.

The mounting part 140 may be configured as at least one part or may be configured as two parts 141 and 142 having the vibration plate 110 interposed therebetween. As for the mounting part 140, first and second mounting regions 141a and 142a having a predetermined area may be placed parallel to each other while having the vibration plate 110 interposed therebetween. Also, a first connection portion 141b may be formed to connect the first mounting region 141a with the central portion of the body of the vibration plate 110, and a second connection portion 142b may be formed to connect the second mounting region 142a with the central portion of the body of the vibration plate 110.

The mass part 130 may be mounted on the mounting part 140 in order to add a preset magnitude of mass to the vibration plate 110. The mass part 130 may include a mass body corresponding to the mounting region of the mounting part 140. Since the mounting portion 140 has the first and second mounting regions 141a and 142a, the mass part 130 may also include first and second mass bodies 131 and 132.

The first mass body 131 may be mounted on the first mounting region 141a, and the second mass body 132 may be mounted on the second mounting region 142a. In this way, the mass of the first and second mass bodies 131 and 132 may be applied to the central portion of the body of the vibration plate 110. That is, the mass of the mass body 130 is applied to the vibration plate 110 through a neck structure. Accordingly, the mass can be added while achieving a reduction in the thickness thereof and suppressing the loss of driving force.

Figure 4:
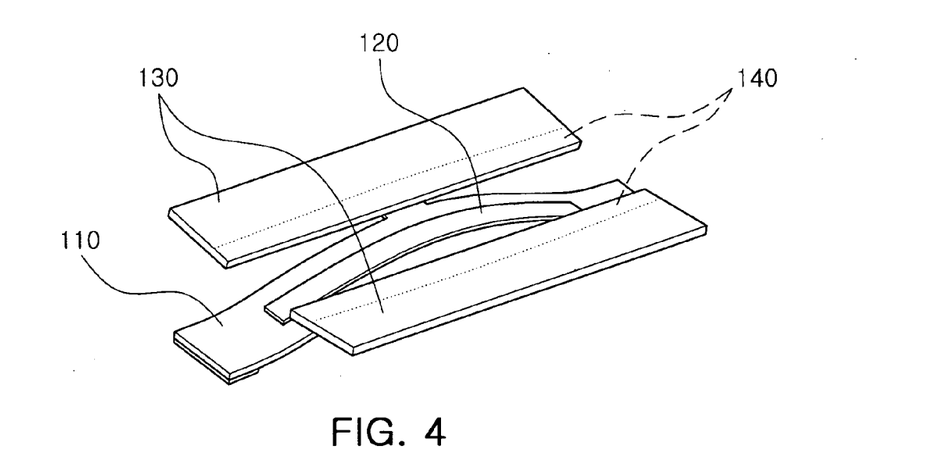
FIG. 4 is a view illustrating how a vibration plate of the vibration generator vibrates.

The at least one piezoelectric element 120 may be mounted on the top surface of the body of the vibration plate 110, preferably in the lengthwise direction of the body. The at least one piezoelectric element 120 is repetitively compressed and expanded in response to applied external power to thereby cause the vibration plate 110 to be bent up and down as shown in FIG. 4 and thus vibrated accordingly, which, as a result, generates vibration force. At this time, the mass part 130 may increase the vibration force by adding its mass to the central portion on which the displacement of the vibration plate 110 reaches the maximum level.

Namely, the vibration force may be increased by increasing the mass of the vibration plate 110 or increasing the driving displacement, as expressed in equation 1 below:

$$F = m \ast x \ast w2 \qquad \text{(Equation 1)}$$

where F denotes vibration force, m denotes the mass of a vibration plate, x denotes the displacement of the vibration plate, and w denotes a vibration frequency of the vibration plate.

Figure 3:
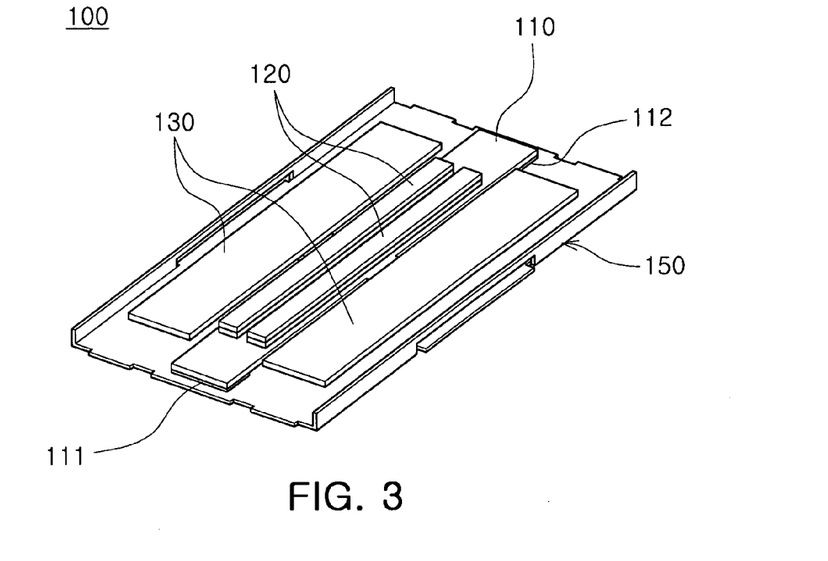
FIG. 3 is a perspective view illustrating a piezoelectric element employed in the vibration generator of FIG. 1, according to an exemplary embodiment of the present invention.

As referred to above, the at least one piezoelectric element 120 may be mounted. However, as shown in FIG. 3, a plurality of piezoelectric elements 120 may be mounted on the top of the body of the vibration plate 110, and the piezoelectric element 120 may have a monolayer or a multilayer structure. In the case in which a multilayer piezoelectric element is used, a sufficient level of power to drive the piezoelectric element can be obtained even at a low voltage level, and therefore, driving power having a low voltage level may be used.

Meanwhile, the vibration generator according to exemplary embodiments of the present invention may be configured in various ways, and one of the embodiments will now be described with reference to the accompanying drawings.

Figure 5:
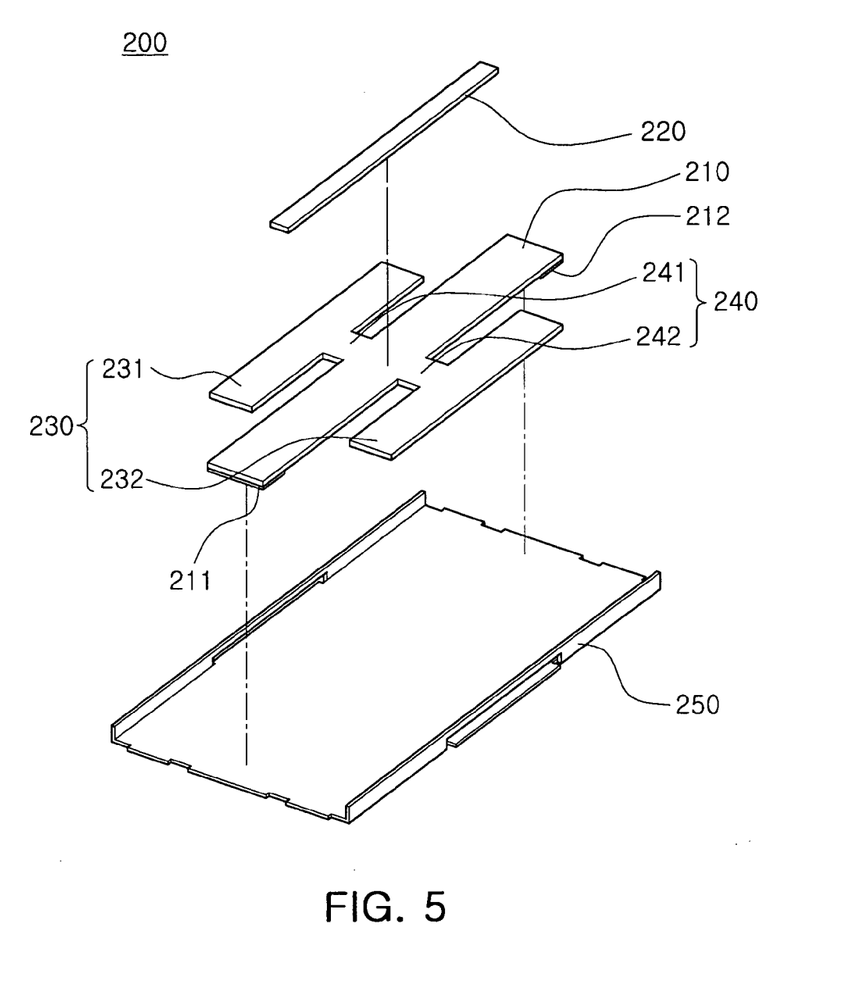
FIG. 5 is a schematic exploded perspective view illustrating a vibration generator according to another exemplary embodiment of the present invention.
Figure 6A:
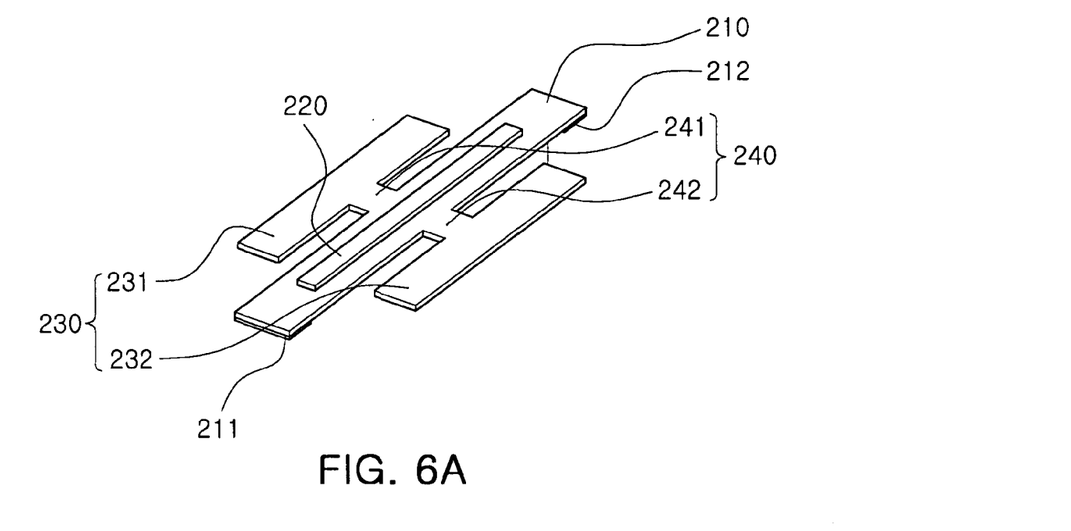
FIG. 6A is a partial perspective view illustrating the vibration generator of FIG. 5.
Figure 6B:
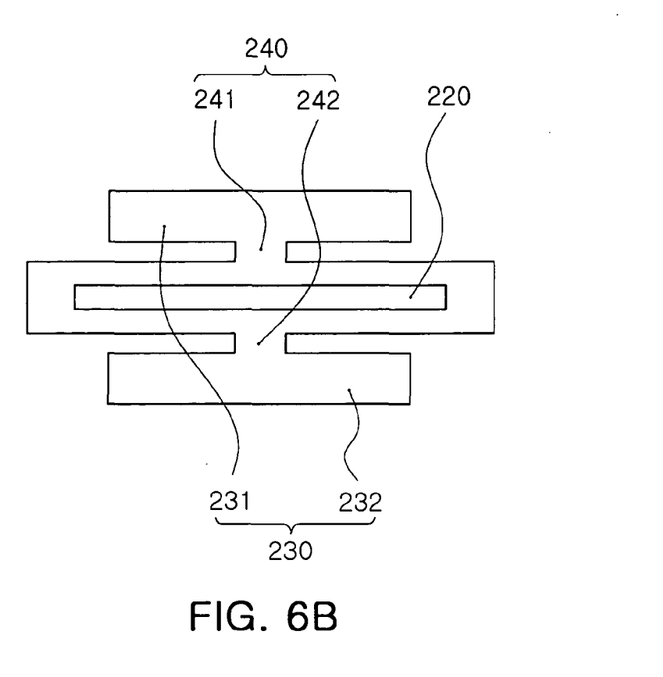
FIG. 6B is a front view of the vibration generator of FIG. 5.
Figure 7:
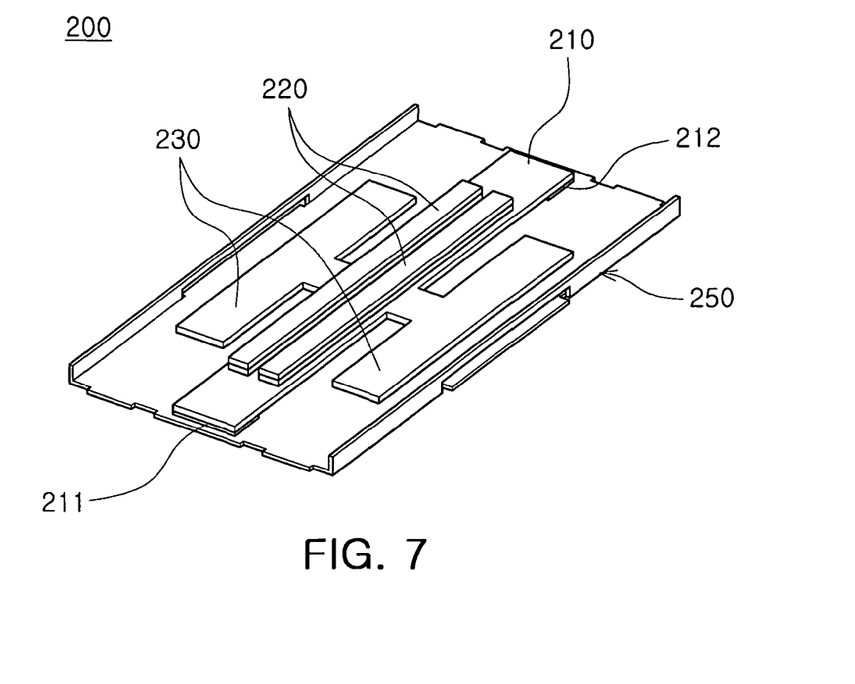
FIG. 7 is a perspective view illustrating a piezoelectric element, employed in the vibration generator of FIG. 5, according to another exemplary embodiment of the present invention.

FIG. 5 is a schematic exploded perspective view illustrating a vibration generator according to another exemplary embodiment of the present invention, FIG. 6A is a partial perspective view illustrating the vibration generator according to this exemplary embodiment of the present invention, and FIG. 6B is a front view of the vibration generator according to this exemplary embodiment of the present invention. FIG. 7 is a perspective view illustrating a piezoelectric element, employed in the vibration generator of FIG. 5, according to an exemplary embodiment of the present invention.

Referring to FIGS. 5, 6A and 6B, a vibration generator 200, according to another exemplary embodiment of the present invention, may include a vibration plate 210, at least one piezoelectric element 220, a mass part 230, a connection part 240, and a receiving part 250.

The vibration plate 210 includes a body having a preset length, and may vibrate due to its body being bent when vibrations are applied thereto. The connection portion 240 may be formed at the central portion of the body in the lengthwise direction of the body.

Furthermore, respective support parts 211 and 212 may be placed at both ends of the body in the lengthwise direction thereof. The support parts 211 and 212 contact the receiving part 250 to thereby support the body.

The connection part 240 may be configured as at least one unit or may be configured as two units 241 and 242 having the vibration plate 210 placed therebetween. Namely, the connection part 240 may include a first connection unit 241 connecting a first mass body 231 with the central portion of the body of the vibration plate 210, and a second connection unit 242 connecting the second mass body 232 with the central portion of the body of the vibration plate 210. Here, the first and second connection units 241 and 242 may be disposed parallel to each other while having the vibration plate 210 placed therebetween.

The mass part 230 is connected to the connection part 240 to thereby be able to add a preset magnitude of mass to the vibration plate 210, and may include a mass body corresponding to the connection units of the connection part 240. That is, since the connection part 240 includes the first and second connection units 241 and 242, the mass part 230 may include first and second mass bodies 231 and 232.

The first mass body 231 is connected to the first connection unit 241, and the second mass body 232 may be connected to the second connection unit 242. That is, the first and second connection units 241 and 242 extend from the central portion of the body of the vibration plate 210 and are connected to the first and second mass bodies 231 and 232, respectively, so as to apply the mass of the first and second mass bodies 231 and 232 to the central portion of the body of the vibration plate 210. That is, since the first and second connection units 241 and 242 extend from the vibration plate 210 to have a neck structure, the mass can be added to the vibration plate 210 while minimizing the thickness thereof and the loss of driving force therein.

The at least one piezoelectric element 220 may be mounted on the top surface of the body of the vibration plate 210, preferably in the lengthwise direction of the body of the vibration plate 210.

As described, the at least one piezoelectric element 220 may be mounted. However, as shown in FIG. 7, a plurality of piezoelectric elements 220 may be mounted on the top of the body of the vibration plate 210, and the piezoelectric element 220 may have a monolayer or multilayer structure.

Figure 8:
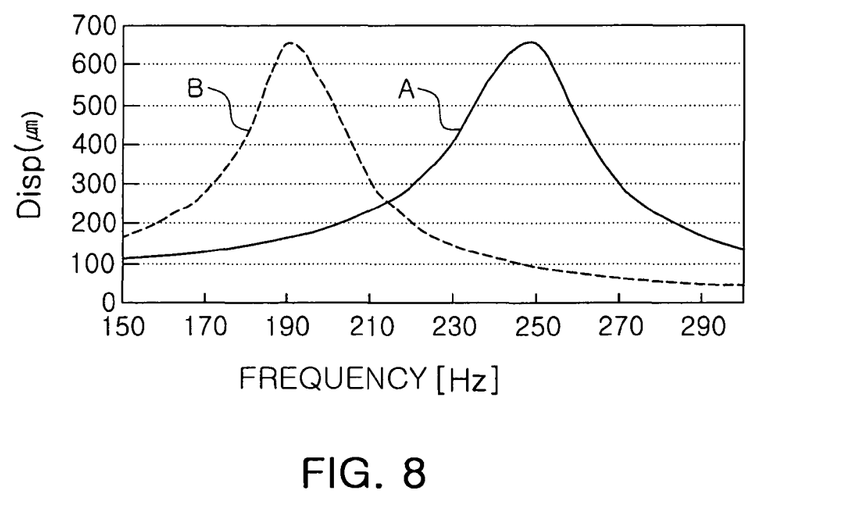
FIG. 8 is a graph showing the resonant frequency of a vibration generator according to the present invention.

FIG. 8 is a graph showing the resonant frequency of a vibration generator according to the present invention.

Referring to FIG. 8, the resonant frequency of the vibration generator according to the invention may be varied according to the purpose of using the vibration generator. That is, in the case in which the vibration generator is employed for use in a cellular phone, the resonant frequency of the vibration generator may be set to fall within the range of 150 Hz to 200 Hz as indicated by curve 'B' of the graph, if an alarm function for calls, text messages and the like is considered to be important, whereas the resonant frequency thereof may be set to be within a band over 200 Hz as indicated by graph A of the graph if the use of a haptic function is considered to be important.

The resonant frequency is determined by the mass and rigidity of the vibration plate, as expressed by equation 2 below:

$$Fn = \sqrt{\frac{k}{m}} \quad \text{(Equation 2)}$$

where Fn denotes a resonant frequency, m denotes the mass of a vibration plate, and k denotes the rigidity of the vibration plate.

As expressed by equation 2 above, the resonant frequency may be set to be low by increasing the mass of the vibration plate or decreasing the rigidity thereof.

The rigidity of the vibration plate may be increased or reduced according to the length, thickness, width, mechanical and physical measures and the like of the vibration plate, as expressed by equation 3 below:

$$k \propto C \times \frac{EI}{L^3} \quad \text{(Equation 3)}$$

where k denotes the rigidity of a vibration plate, E denotes Young's modulus, I denotes a moment of inertia, L denotes the effective length of the vibration plate, and C denotes a preset constant.

The vibration plate 110 may be formed of a preset metallic material. Furthermore, the vibration plate 110 may be formed of a metallic material such as tungsten and stainless steel (SUS) having a high density per unit area. In addition, the vibration plate 110 may be formed of a material, such as Invar, having a similar thermal expansion coefficient to that of the piezoelectric element 120. The piezoelectric element 120 may suffer from piezoelectric deterioration, which means deterioration in electrical properties caused by thermal stress under high temperature or thermal shock. Since a reduction in thermal stress can be achieved by a sufficiently small difference between the thermal expansion coefficients of the piezoelectric element and the vibration plate, the vibration plate may be desirably formed of a material having a similar thermal expansion coefficient to that of the piezoelectric element, such as Invar, in terms of the prevention of piezoelectric determination.

The vibration plate 110, the piezoelectric element 120, the mass part 130 and the mounting part 140, or the vibration plate 210, the piezoelectric element 220, the mass part 230 and the connection part 240 are accommodated by the respective receiving parts 150 and 250 to thereby be utilized for various electronic devices.

Figure 9:
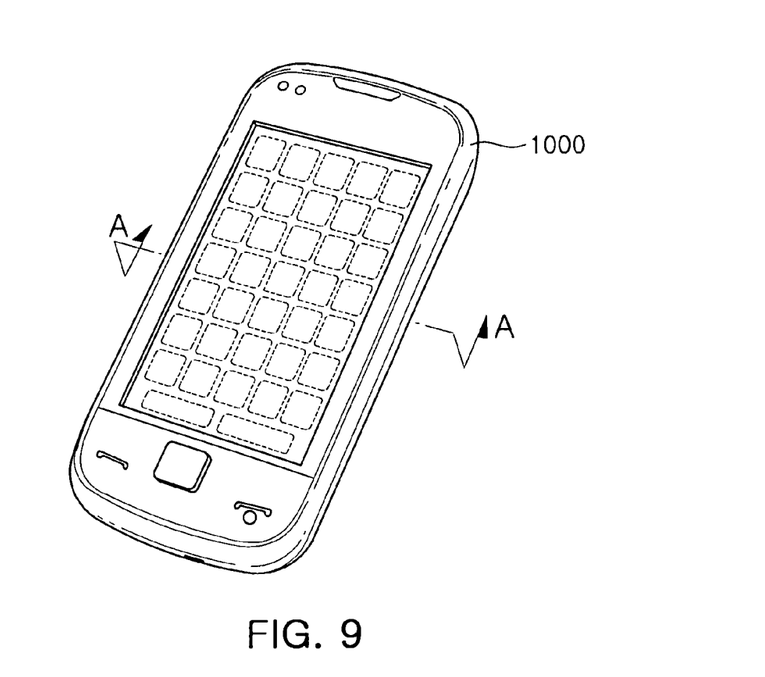
FIG. 9 is a schematic perspective view illustrating an electronic device according to an exemplary embodiment of the present invention.
Figure 10:
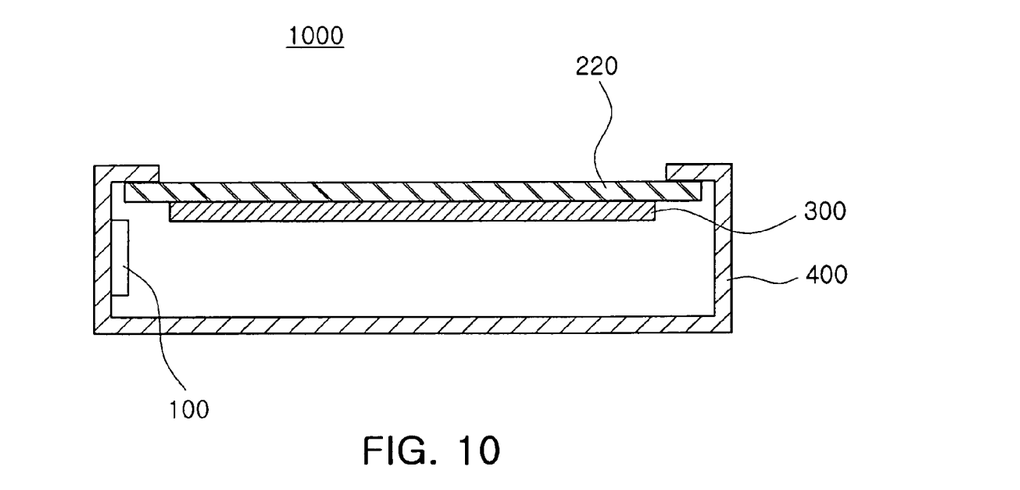
FIG. 10 is a schematic cross-sectional view illustrating the electronic device of FIG. 9.
Figure 11:
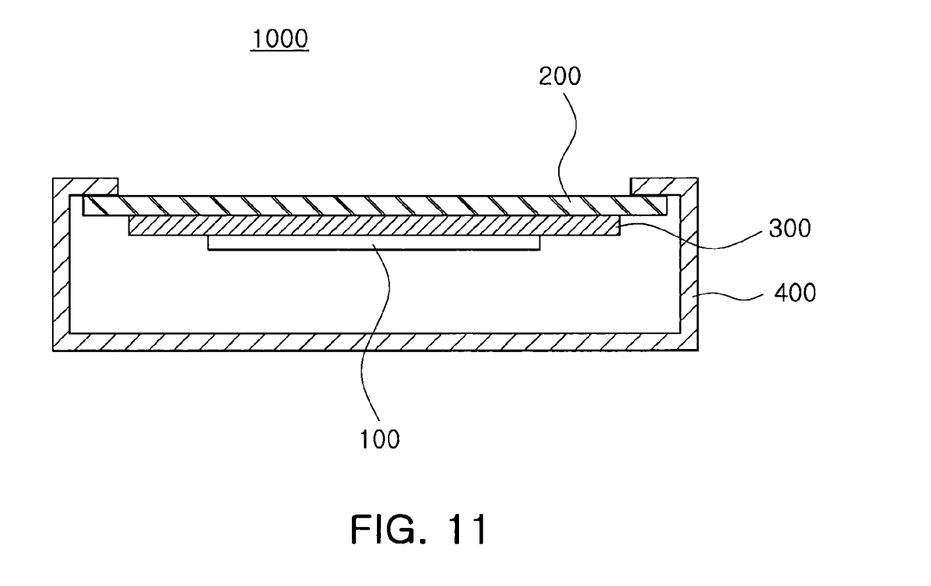
FIG. 11 is a cross-sectional view illustrating an electronic device according to another exemplary embodiment of the present invention.

FIG. 9 is a schematic perspective view illustrating an electronic device according to an exemplary embodiment of the present invention. FIG. 10 is a schematic cross-sectional view illustrating the electronic device of FIG. 9, and FIG. 11 is a cross-sectional view illustrating an electronic device according to another exemplary embodiment of the present invention.

As shown in FIG. 9, an electronic device 1000, according to an exemplary embodiment of the preset invention, may display an image upon a user's selection. Referring to FIG. 10, the electronic device 1000 may include a display module displaying an image upon a user's selection, and a case 400 having an internal space receiving the display module. The display module may include a touch panel 200 providing the pressure of a user's contact pressure, and a display panel 300 mounted on the bottom of the touch panel 200 to provide an image upon the user's selection. The vibration generator 100, according to the exemplary embodiments of the present invention, is mounted on the inner surface of the case 400 to thereby provide vibration depending on the user's selection. As shown in FIG. 11, the vibration generator 100 may be mounted on the bottom of the display panel 300 to thereby directly provide vibration to the display module.

As described above, driving force is increased by adding mass to the point of the vibration plate in which the displacement is the highest. Thus, the vibration device and the electronic device including the same, according to the exemplary embodiments of the present invention, can achieve a reductions in weight, thickness and size, as compared to the case in which driving force is increased by increasing the mass of the entire vibration plate.

As set forth above, according to exemplary embodiments of the invention, the mass of a mass body is additionally applied to the vibration plate to thereby increase the vibration force of the vibration plate.

While the present invention has been shown and described in connection with the exemplary embodiments, it will be apparent to those skilled in the art that modifications and variations can be made without departing from the spirit and scope of the invention as defined by the appended claims.

What is claimed is:

1. A vibration generator comprising:
   at least one piezoelectric element subjected to compression and expansion in response to input power;
   a vibration plate including a body elongated in a lengthwise direction and having the at least one piezoelectric element mounted thereon, and generating vibrations by the compression and expansion of the at least one piezoelectric element;
   at least one mass part adding a preset magnitude of mass to the vibration plate; and
   support parts placed at each end of the body in the lengthwise direction, and supporting and fixing the body; and
   at least two mounting plates attached to different sides along the lengthwise direction of the body of the vibration plate and at least one of the two mounting plates having the at least one mass part mounted thereon to apply the mass of the at least one mass part to the vibration plate,
   wherein the body, except for portions of the body corresponding to the support parts, is bent when vibrations are applied to the body.

2. The vibration generator of claim 1, further comprising a mounting part extending from the vibration plate and having the at least one mass part mounted thereon to apply the mass of the at least one mass part to the vibration plate.

3. The vibration generator of claim 2, wherein the mounting part applies the mass of the at least one mass part to a central portion of the vibration plate in the lengthwise direction thereof.

4. The vibration generator of claim 3, wherein the mass part comprises a first mass body and a second mass body disposed to have the vibration plate placed therebetween, and adding mass thereof to the vibration plate.

5. The vibration generator of claim 4, wherein the mounting part comprises:
   a first mounting region on which the first mass body is mounted;
   a second mounting region on which the second mass body is mounted;
   a first connection portion connected between the central portion of the vibration plate and the first mounting region, and applying the mass of the first mass body to the vibration plate; and
   a second connection portion connected between the central portion of the vibration plate and the second mounting region, and applying the mass of the second mass body to the vibration plate.

6. The vibration generator of claim 2, further comprising a receiving part receiving the vibration plate and the mounting part.

7. The vibration generator of claim 1, wherein the at least one mass part is formed of a metallic material having a preset density.

8. The vibration generator of claim 1,
   wherein the at least one mass part is formed of at least one of stainless steel (SUS) and tungsten having a preset density.

9. The vibration generator of claim 1, wherein the vibration plate is formed of a metallic material.

10. The vibration generator of claim 9, wherein the vibration plate is formed of Invar.

11. The vibration generator of claim 1, wherein the at least one piezoelectric element is a monolayer piezoelectric element or a multilayer piezoelectric element.

12. The vibration generator of claim 1, further comprising a connection part extending from the vibration plate and connected to the at least one mass part to apply the mass of the at least one mass part to the vibration plate.

13. The vibration generator of claim 12, wherein the connection part connects the at least one mass part to a central portion of the vibration plate in the lengthwise direction thereof to apply the mass of the at least one mass part to the central portion.

14. The vibration generator of claim 13, wherein the mass part comprises a first mass body and a second mass body having the vibration plate placed therebetween and adding mass thereof to the vibration plate.

15. The vibration generator of claim 14, wherein the connection part comprises:

a first connection unit connected between the central portion of the vibration plate and the first mass body and applying the mass of the first mass body to the vibration plate; and a second connection unit connected between the central portion of the vibration plate and the second mass body and applying the mass of the second mass body to the vibration plate.

16. The vibration generator of claim 12, further comprising a receiving part receiving the vibration plate, the connection part and the mass part.

17. The vibration generator of claim 16, further comprising a support part disposed at each end of the body of the vibration plate in the lengthwise direction and supporting the body from the receiving part.

18. The vibration generator of claim 1, wherein the support parts are attached to a rigid receiving part, which does not bend when vibrations are applied to the body.

* * * * *